United States Patent
Yin et al.

(10) Patent No.: US 8,827,269 B2
(45) Date of Patent: Sep. 9, 2014

(54) GUIDER FOR CONVEYING SHEET-SHAPED OBJECT

(75) Inventors: Guangjun Yin, Guangzhou (CN); Dong Tan, Guangzhou (CN); En Wu, Guangzhou (CN)

(73) Assignee: GRG Banking Equipment Co., Ltd., Guangzhou (CN)

( * ) Notice: Subject to any disclaimer, the term of this patent is extended or adjusted under 35 U.S.C. 154(b) by 0 days.

(21) Appl. No.: 13/877,087

(22) PCT Filed: Mar. 27, 2012

(86) PCT No.: PCT/CN2012/073094
§ 371 (c)(1),
(2), (4) Date: Apr. 23, 2013

(87) PCT Pub. No.: WO2012/139459
PCT Pub. Date: Oct. 18, 2012

(65) Prior Publication Data
US 2014/0041988 A1     Feb. 13, 2014

(30) Foreign Application Priority Data

Apr. 13, 2011    (CN) .......................... 2011 1 0092139

(51) Int. Cl.
*B65H 39/10* (2006.01)
*B65G 47/64* (2006.01)
*B65H 29/58* (2006.01)

(52) U.S. Cl.
CPC ...... *B65G 47/647* (2013.01); *B65H 2701/1912* (2013.01); *B65H 2403/512* (2013.01); *B65H 2301/3125* (2013.01); *B65H 29/58* (2013.01); *B65H 2301/44822* (2013.01); *B65H 2404/61* (2013.01)
USPC .......................................... 271/301; 271/303

(58) Field of Classification Search
CPC .................. B65H 29/58; B65H 29/60; B65H 2301/3124; B65H 2404/63
USPC .......................................... 271/301, 303, 291
See application file for complete search history.

(56) References Cited

U.S. PATENT DOCUMENTS

| 5,167,300 A | 12/1992 | Yoshida et al. |
| 5,536,002 A | 7/1996 | Yosida et al. |
| 2008/0143042 A1 | 6/2008 | Spence et al. |
| 2010/0194033 A1 | 8/2010 | Berendes |

FOREIGN PATENT DOCUMENTS

| CN | 101081668 A | 12/2007 |
| CN | 101802878 A | 8/2010 |

(Continued)

OTHER PUBLICATIONS

European Search Report for European counterpart application 12771063.0.

*Primary Examiner* — Michael McCullough
(74) *Attorney, Agent, or Firm* — Kilpatrick Townsend & Stockton LLP (57) ABSTRACT

A guider for conveying a sheet-shaped object comprises two side plates; two wheel components arranged in parallel between the two side plates, a top channel plate being disposed on a top portion of the wheel components; and a lifting channel plate disposed between the two wheel components and the top channel plate, the lifting channel plate forming a horizontal channel with the top channel plate, and respectively forming lateral channels with the two wheel components. The lifting channel plate is disposed on the two side plates in a height-adjustable manner. The guider further comprises: a first driving device for driving the lifting channel plate to move up and down; a reversing member hinged between the two lateral channels and used for switch between the two lateral channels; and a second driving device for driving the reversing member to rotate. The guider for conveying a sheet-shaped object of the present invention simplifies the structure of the guider, and meanwhile reduces the manufacturing cost of the guider.

18 Claims, 8 Drawing Sheets

(56) References Cited

FOREIGN PATENT DOCUMENTS

| | | |
|---|---|---|
| CN | 102139818 A | 8/2011 |
| EP | 1544144 A1 | 6/2005 |
| GB | 2280893 A | 2/1995 |
| JP | H0213565 A | 1/1990 |
| JP | 2000072306 A | 3/2000 |
| JP | 2005-247467 | 9/2005 |
| WO | 9817570 A1 | 4/1998 |

GUIDER FOR CONVEYING SHEET-SHAPED OBJECT

The present application is the US national phase of International Application No. PCT/CN2012/073094 filed on Mar. 27, 2012, which claims the benefit of priority to Chinese Patent Application No. 201110092139.X titled "guider for conveying sheet-SHAPED OBJECT", filed with Chinese State Intellectual Property Office on Apr. 13, 2011, which is incorporated herein by reference in its entirety.

FIELD OF THE INVENTION

A The present application relates to the technical field of guider, and more particularly to a guider for conveying sheet objects.

BACKGROUND OF THE INVENTION

Devices for processing sheet objects are widely used in our lives, e.g., an automatic teller machine, a moneychanger, a ticket vending machine. Objects processed by these processing devices are sheet objects such as banknotes or bills. The processing devices in operation need to convey the sheet objects in different directions in accordance with requirements of processing.

Chinese Patent Application No. 200880101729.0 a three-way guider for redirecting sheet media, which can convey and guide sheet objects in three directions. The guider has three driving devices, i.e., one step motor and two lifting magnets. The guider controls to redirect two lateral passages as follows. The step motor drives a drive rod to rotate via two drive wheels. Pinions are provided at two ends of the drive rod, and racks are provided integrally on two guide plates of the guider. Thus, in rotation of the drive rod, the pinions engage with the racks, thereby driving the guide plates to move upwardly or downwardly. Blades of the guider are provided on the guide plates, and thus the upward or downward movement of the guide plates leads to the upward or downward movement of the blades of the guider, thereby realizing the redirection of the two lateral passages. As can be seen from the above operation, merely the redirection between the two lateral passages involves many transmission components. In this case, in order to ensure the normal upward or downward movement of the blades of the guider, the pinion and rack transmission is needed for both ends of the guider body. The many transmission components needed for the redirection between the two lateral passages of the guider causes a complex structure of the whole guider.

In addition, the conveyance of the sheet objects in three directions for the above three-way guider needs the step motor and the two lifting magnets. Many power devices are involved in the whole guider and thus the production cost of the whole guider is increased.

SUMMARY OF THE INVENTION

In view of the fact, there is provided a guider for conveying sheet objects according to embodiments of the present application, which has a simple structure and has a reduced cost of production.

In order to achieve the object, the following technical solutions are provided according to an embodiment of the present application.

A guider for conveying sheet materials, including:

two side plates;

two wheel assemblies disposed in parallel between the two side plates, a top passage plate being provided at tops of the two wheel assemblies;

a rise-lower passage plate provided among the two wheel assemblies and the top passage plate, wherein a horizontal passage is formed between the rise-lower passage plate and the top passage plate, and lateral passages are formed between the rise-lower passage plate and the wheel assembly as well as between the rise-lower passage plate and the wheel assembly, and wherein the rise-lower passage plate is arranged hoistably and lowerably in the two side plates;

a first driving device adapted to drive the rise-lower passage plate to move upwardly or downwardly;

a redirecting member hinged between the two lateral passages and configured to perform a switch between the two lateral passages; and a second driving device adapted to drive the redirecting member to rotate.

Preferably, the first driving device includes:

a motor;

a cam connected with an output shaft of the motor;

a rotation shaft, which has two ends hinged to the two side plates respectively;

two first connecting arms, each of which has two ends fixedly connected to the rotation shaft and the rise-lower passage plate respectively; and a second connecting arm fixedly connected to the rotation shaft and being in contact with a rim of the cam, wherein the rise-lower passage plate is located at an uppermost position if a lowermost position of the rim of the cam is in contact with the second connecting arm.

Preferably, the guider for conveying sheet objects further includes: an extension spring, which has one end hitched to the second connecting arm and the other end hitched to the side plate adjacent to the second connecting arm.

Preferably, in the guider for conveying sheet objects, the motor is fixed to the side plate adjacent to the second connecting arm by a motor fixing seat.

Preferably, the guider for conveying sheet objects further includes: a controller, an upper sensor and a lower sensor, in which the upper sensor and the lower sensor are provided on the side plate adjacent to the second connecting arm, are arranged in an up-and-down form, and are adapted to detect a position of the second connecting arm, and the controller is adapted to receive a signal from the upper sensor and the lower sensor and to control the motor to start or stop in response to the signal.

Preferably, in the guider for conveying sheet objects, the upper sensor and the lower sensor are each of a U-shaped structure, and the second connecting arm is located within the detection limits of the U-shaped structures.

Preferably, in the guider for conveying sheet objects, grooves are provided in the side plates, and two ends of the rise-lower passage plate are slidable in the grooves.

Preferably, in the guider for conveying sheet objects, two sides of the rise-lower passage plate are provided with a plurality of comb teeth.

Preferably, in the guider for conveying sheet objects, the plurality of comb teeth is distributed uniformly on the two sides of the rise-lower passage plate.

Preferably, in the guider for conveying sheet objects, the guider for conveying sheet objects is a guider for conveying banknotes.

As can be known from the above technical solutions, in the guider for conveying sheet objects according to embodiments of the present application, the lateral passages are formed between the two wheel assemblies provided between the two side plates and the rise-lower passage plate respectively so as to convey the sheet objects in a vertical direction, and the horizontal passage is formed between the rise-lower passage plate and the top passage plate to convey the sheet objects in a horizontal direction. The rise-lower passage plate is provided hoistably and lowerably in the two side plates to implement upward and downward movement. If the first driving device drives the rise-lower passage plate to move upwardly to the uppermost position, the horizontal passage is closed and the lateral passages are open. In this case, with the redirecting member being hinged between the two lateral passages, the second driving device drives the redirecting member to rotate, so as to implement the switch between the two lateral passages. If the rise-lower passage plate moves downwardly to the lowermost position, the lateral passages are closed and the horizontal passage is open to convey the sheet objects in the horizontal direction. The present application can realize the functions of the existing guider. In the guider, the first driving device directly drives the rise-lower passage plate to move upwardly or downwardly so as to achieve the switch between the horizontal passage and the lateral passages, and the second driving device drives the redirecting member to rotate so as to achieve the switch between the two lateral passages.

Compared with the guider in the prior art, in the guider for conveying sheet materials according to the present application, the switch between the two lateral passages may be implemented only by the second driving device rotating the redirecting member hinged between the two lateral passages. However, in the prior art, such a function may be implemented with the need of the step motor, the drive wheels, the drive rod, and the pinion and rack transmission mechanism. Compared with the prior art in which the switch between two lateral passages is implemented by a series of transmission components, the guider for conveying sheet objects according to embodiments of the present application has a simplified structure.

In addition, in the guider for conveying sheet materials according to embodiments of the present application, the redirecting member for implementing the switch between the two lateral passages is driven by the second driving device to rotate, and the movement of the rise-lower passage plate is implemented by the first driving device. Thus, at most two power devices may be applied in the guider for conveying sheet objects according to embodiments of the present application. Compared with the guider in the prior art which adopts the step motor and the two lifting magnets to implement the switch between passages, the power sources are reduced and the production cost of the guider is reduced according to embodiments of the present application.

BRIEF DESCRIPTION OF THE DRAWINGS

In order to describe embodiments of the present application or the technical solution in the prior art more clearly, drawings referred to in the description of the embodiments or the prior art are briefly described. Apparently, the drawings described below only relate to some embodiments of the present application, and other drawings can be obtained on the basis of these drawings for the skilled in the art without creative effort.

DETAILED DESCRIPTION OF THE INVENTION

Hereinafter, technical solutions of embodiments of the present application are described clearly and completely in conjunction with the drawings of the embodiments of the present application. Apparently, the embodiments described herein are only a part of, not all embodiments of the present application. Based on the embodiments of the present application, all of other embodiments obtained by the skilled in the art without creative effort are deemed to fall into the scope of protection of the present application.

In an embodiment of the present application, a guider for conveying sheet objects is provided. The guider has a simple structure, a reduced number of driving devices compared with the guider in the prior art and thus a reduced manufacture cost of the whole guider.

Figure 1:
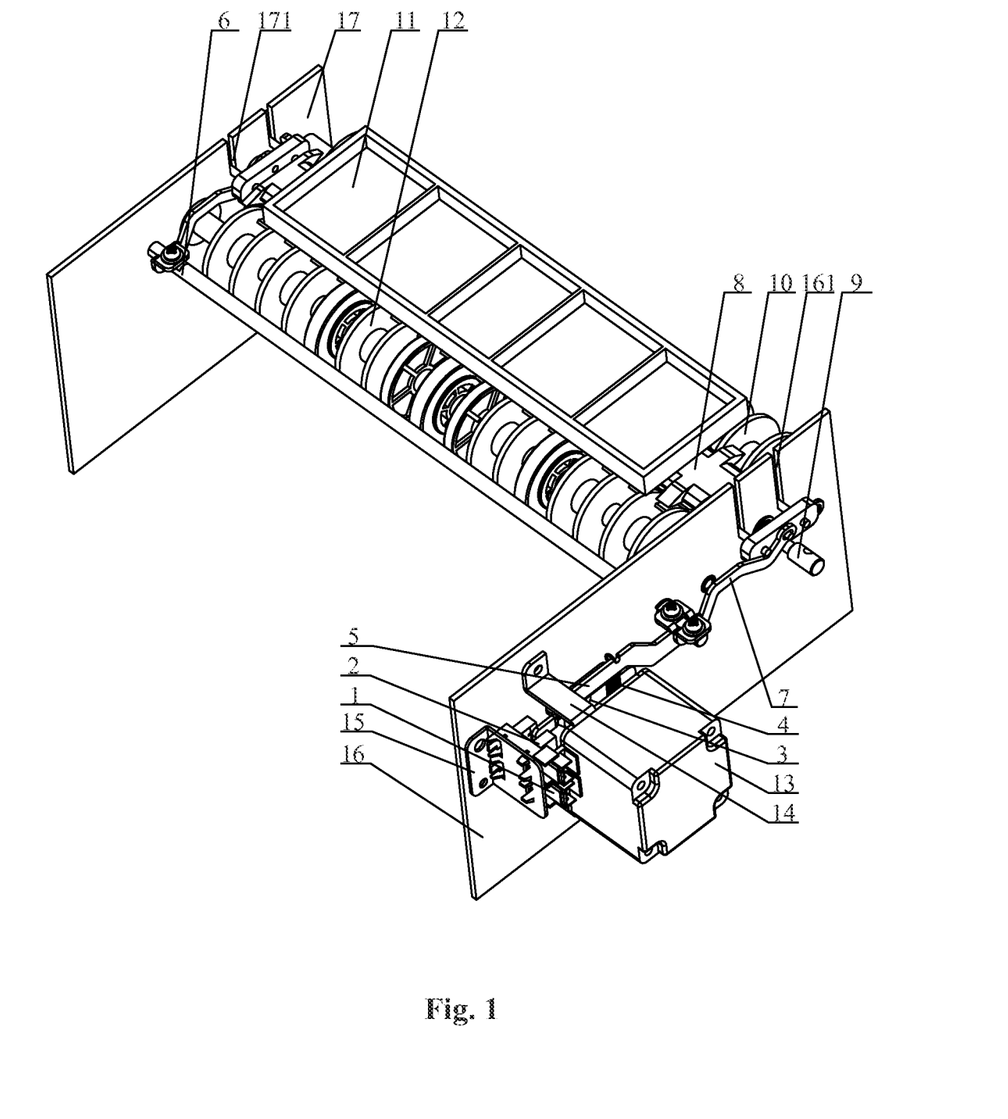
FIG. 1 is a structural diagram of a guider for conveying sheet objects according to an embodiment of the present application.
Figure 2:
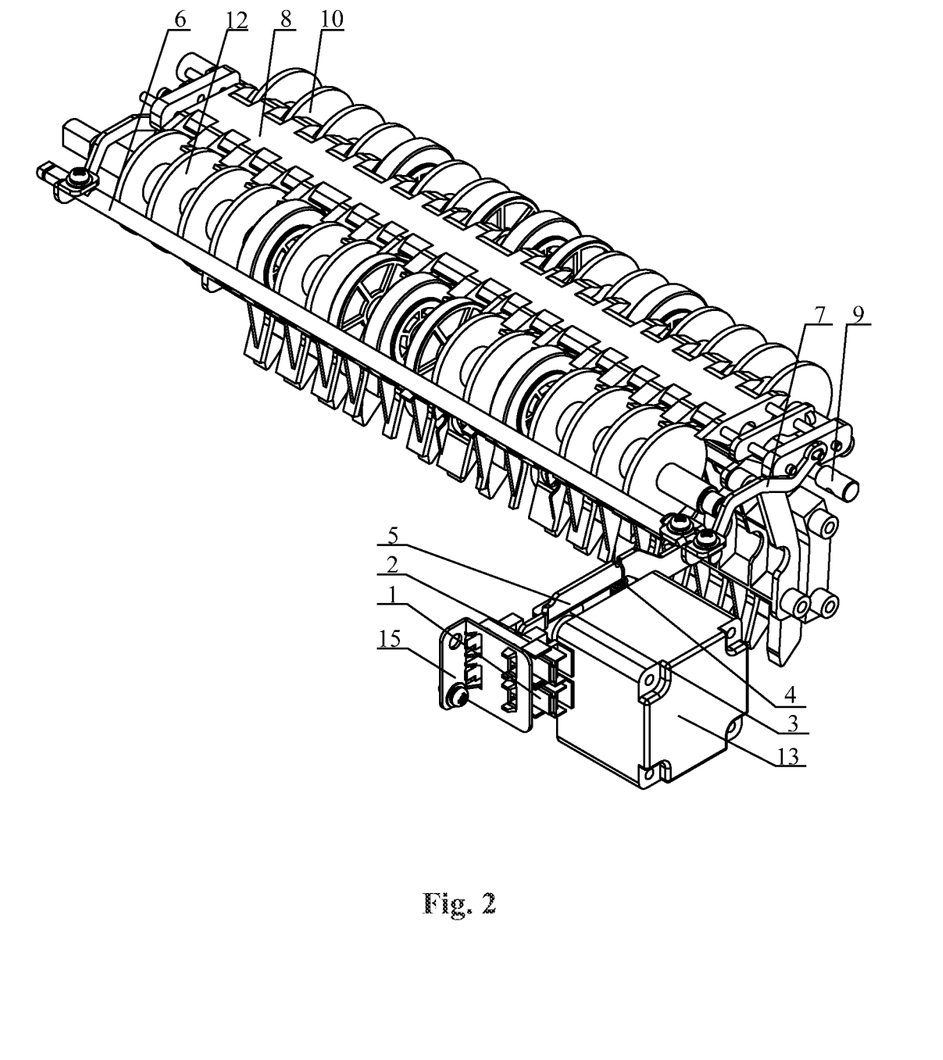
FIG. 2 is a partial structural diagram of a guider fir conveying sheet objects according to an embodiment of the present application.

FIG. 1 is a structural diagram of a guider for conveying sheet objects according to an embodiment of the present application. FIG. 2 is a partial structural diagram of a guider for conveying sheet objects according to an embodiment of the present application.

The guider for conveying sheet objects according to the embodiment of the present application includes two side plates (a side plate 16 and a side plate 17), two wheel assemblies (a wheel assembly 12 and a wheel assembly 10), a top passage plate 11, a rise-or-fall passage plate 8, a first driving device, a redirecting member 9 and a second driving device.

In the guider for conveying sheet objects, the wheel assembly 12 and the wheel assembly 10 are disposed in parallel between the side plate 16 and the side plate 17. The top passage plate 11 is provided at the tops of the wheel assembly 12 and the wheel assembly 10, and a horizontal passage is formed between the wheel assemblies 12, 10 and the top passage plate 11.

The rise-lower passage plate 8 is disposed between the two wheel assemblies (the wheel assembly 12 and the wheel assembly 10) and the top passage plate 11. Lateral passages are formed between the rise-lower passage plate 8 and the respective wheel assemblies 12 and 10, that is, two lateral passages are formed. The rise-lower passage plate 8 is arranged hoistably and lowerably in the side plate 16 and the side plate 17.

The first driving device is configured to drive the rise-lower passage plate 8 to move upwardly or downwardly.

The redirecting member 9 is hinged between the two lateral passages, and is adapted to redirect the sheet objects between the two lateral passages, i.e., to switch from one lateral passage to the other lateral passage during the transportation of the sheet objects.

The second driving device is configured to drive the redirecting member 9 to rotate.

In the guider for conveying sheet objects according to the embodiment of the present application, the two lateral passages are formed between the two wheel assemblies (the wheel assembly 12 and the wheel assembly 10) and the rise-lower passage plate 8, so as to achieve the transportation of sheet objects in a vertical direction; and the horizontal passage is formed between the rise-lower passage plate 8 and the top passage plate 11, so as to achieve the transportation of sheet objects in a horizontal direction. The first driving device drives the rise-lower passage plate 8 to move upwardly or downwardly, so as to achieve the switch between the horizontal passage and the lateral passages. The switch between the horizontal passage and the lateral passages is achieved by the first driving device driving the rise-lower passage plate 8. The switch between the two lateral passages is achieved by the second driving device rotating the redirecting member 9.

In the guider in the prior art, the step motor is needed to transmit power to the drive rod via the two drive wheels, and the pinions at both ends of the drive rod drive the racks provided on two guide plates, thus the whole guider body is driven to move upwardly or downwardly and sheet objects are redirected between the two lateral passages. Compared with the prior art, in the guider according to the embodiment of the present application, the sheet objects are redirected between the two lateral passages by the redirecting member 9 provided between the two lateral passages. Specifically, the redirection may be implemented only by the second driving device driving the redirecting member 9 to rotate. The redirecting member 9 may be tension means, a hydraulic telescopic component. Alternatively, the redirecting member 9 may be controlled directly by some controllers to rotate. The guider for conveying sheet objects according to the embodiment of the present application has a simplified structure.

Besides, in the guider for conveying sheet objects according to the embodiment of the present application, the first driving device is utilized to drive the upward or downward movement of the rise-lower passage plate 8, thereby achieving the switch between the horizontal passage and the lateral passages, and the second driving device is utilized to drive the redirecting member 9 to achieve the switch between the two lateral passages. Thus, only two power devices are needed in the guider according to the embodiment. However, one step motor and two lifting magnets are utilized in the guider in the prior art. Compared with the guider in the prior art, the guider for conveying sheet objects according to the embodiment of the present application has the reduced number of power devices and thus a reduced production cost.

The first driving device is mainly adapted to drive the rise-lower passage plate 8 to move upwardly or downwardly. Thus, the first driving device may be a hydraulic telescopic mechanism or a pneumatic telescopic mechanism. Taking the hydraulic telescopic mechanism as an example, a hydraulic cylinder is preferably utilized, and is fixed to one of the side plates, with a telescopic end thereof being fixedly connected to the rise-lower passage plate 8. In this way, the upward or downward movement of the rise-lower passage plate is driven by the telescopic movement of the telescopic end of the hydraulic cylinder, so as to achieve the switch between the horizontal passage and the lateral passages.

In an embodiment of the present application, there is provided a first driving device, including a motor 13, a cam 3, a rotation shaft 6, a second connecting arm 5 and two first connecting arms 7. The cam 3 is connected with an output shaft of the motor 13. Two ends of the rotation shaft 6 are hinged to the two side plates (the side plate 16 and the side plate 17), respectively. Two ends of each of the first connecting arms 7 are fixedly connected to the rotation shaft 6 and the rise-lower passage plate 8, respectively. The second connecting arm 5 is fixedly connected to the rotation shaft 6 and is in contact with a surface of the cam 3. In the operation of the first driving device, the output of the motor 13 drives the cam 3 to rotate so that the second connecting arm 5 drives the rotation shaft 6 to rotate, and the first connecting arm 7 may sway upwardly or downwardly with the rotation of the rotation shaft 6 because the two ends of the first connecting arm 7 are fixedly connected to the rotation shaft 6 and the rise-lower passage plate 8 respectively, thereby achieving the upward or downward movement of the rise-lower passage plate 8. In the first driving device, the horizontal passage is in a closed state and the lateral passages are in an open state if a lowermost position of the rim of the cam 3 comes into contact with the second connecting arm 5; and the horizontal passage is in an open state and the lateral passages are in a closed state if an uppermost position of the rim of the cam 3 comes into contact with the second connecting arm 5. In a preferred embodiment, the first driving device further includes an extension spring 4. If the lowermost position of the rim of the cam 3 is in contact with the second connecting arm 5, the second connecting arm 5 falls down. In order to ensure a rapid and stable switch between the horizontal passage and the lateral passages while the second connecting arm 5 is falling down, the second connecting arm 5 is drawn downwardly under the tension of the extension spring 4. In this way, it is possible to ensure that the second connecting arm 5 sways to the lowermost position rapidly and stably. Of course, the expression "drawn downwardly" in this embodiment refers to the movement from the top to the bottom of the side plate.

In the first driving device, the motor 13 is fixed to the side plate (the side plate 16 as shown in FIG. 1) adjacent to the second connecting arm 5 by a motor fixing seat 14, so that the motor 13 and the side plate may be assembled into one piece.

The guider for conveying sheet objects according to an embodiment of the present application further includes a controller, and an upper sensor 2 and a lower sensor 1 provided on the side plate adjacent to the second connecting arm 5 and arranged in an up-and-down form. The upper sensor 2 and the lower sensor 1 are both adapted to detect a position of the second connecting arm 5, and send corresponding detecting signals, so that the controller controls the motor 13 to start or stop on receiving the corresponding signals. The detailed controlling process is described as follows.

Figure 3:
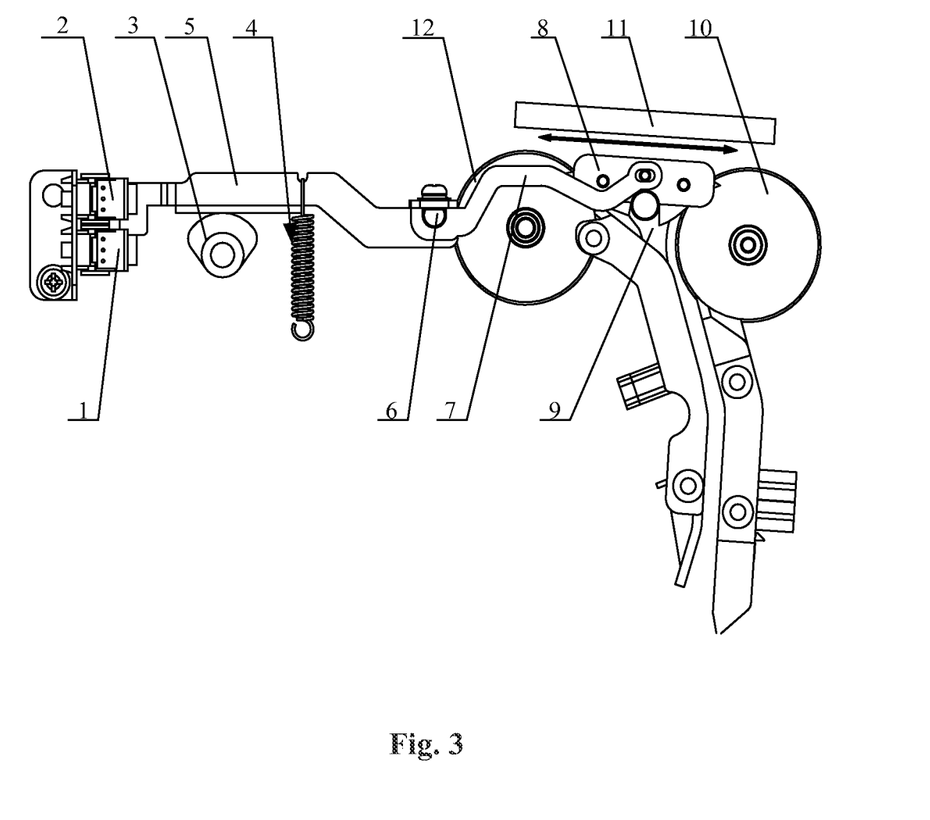
FIG. 3 is a structural diagram of a guider for conveying sheet objects according to an embodiment of the present application in which horizontal passages are opened.
Figure 4:
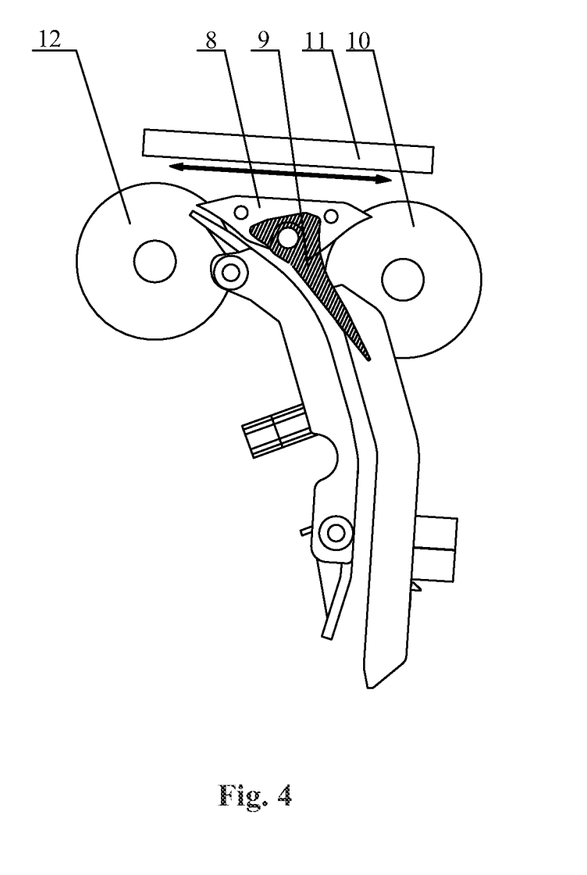
FIG. 4 is an internal structural diagram of a guider for conveying sheet objects according to an embodiment of the present application in which horizontal passages are opened.

Referring to FIGS. 3 to 4, if the horizontal passage is to be opened as desired, the upper sensor 2 detects the second connecting arm 5, and if the second connecting arm 5 is detected, it shows that the horizontal passage has already been opened; if the second connecting arm 5 is not detected, it shows that the horizontal passage is not opened, the upper sensor 2 sends a control signal to the controller, which controls the motor 13 to rotate on receiving the control signal, the motor 13 drives the cam 3 to rotate so that the second connecting arm 5 rotates around the rotation shaft 6 in a clockwise direction. At the same time, the first connecting arm 7 rotates in a clockwise direction, to drive the rise-lower passage plate 8 to move down to open the horizontal passage. In this case, the upper sensor 2 detects the second connecting arm 5 and sends a control signal to the controller, which controls the motor 13 to stop.

Figure 5:
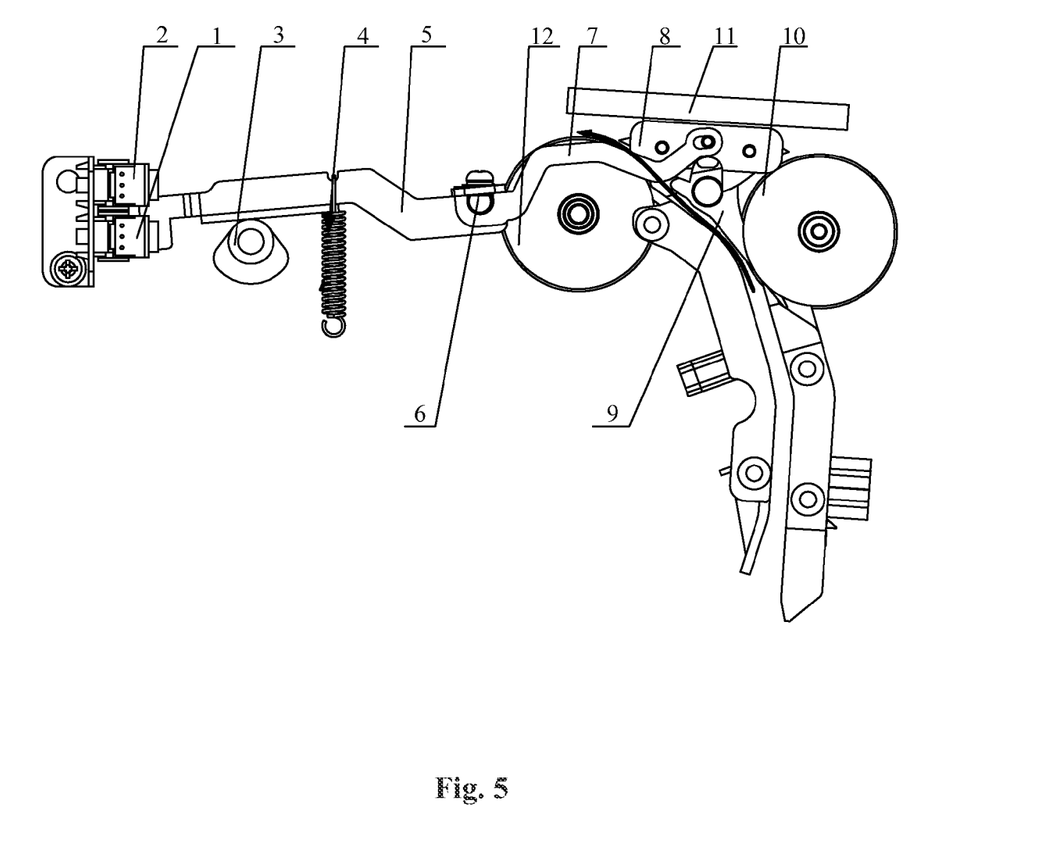
FIG. 5 is a structural diagram of a guider for conveying sheet objects according to an embodiment of the present application in which one lateral passage is opened.
Figure 6:
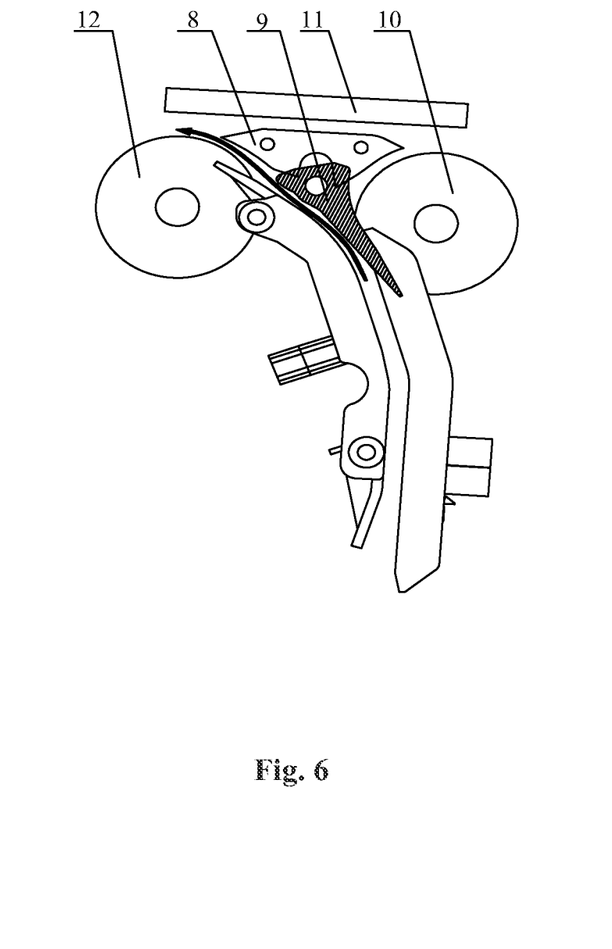
FIG. 6 is an internal structural diagram of a guider for conveying sheet objects according to an embodiment of the present application in which one lateral passage is opened.

Referring to FIGS. 5 and 6, in the case that one of the lateral passages is to be opened as desired, it shows that the vertical passage has already been opened if the lower sensor 1 detects the second connecting arm 5, and it shows that the vertical passage is not opened and the lower sensor 1 sends a signal to the controller if the lower sensor 1 does not detect the second connecting arm 5. On receiving the signal, the controller controls the motor 13 to drive the cam 3 to rotate. The cam 3 rotates from its uppermost position to its lowermost position, so that the second connecting arm 5 falls back. As a result, the first connecting arm 7 sways upwardly to drive the rise-lower passage plate 8 to move upwardly, thereby opening the lateral passage. Meanwhile, the redirecting member 9 is rotated under the drive of the second driving device to open the lateral passage.

Figure 7:
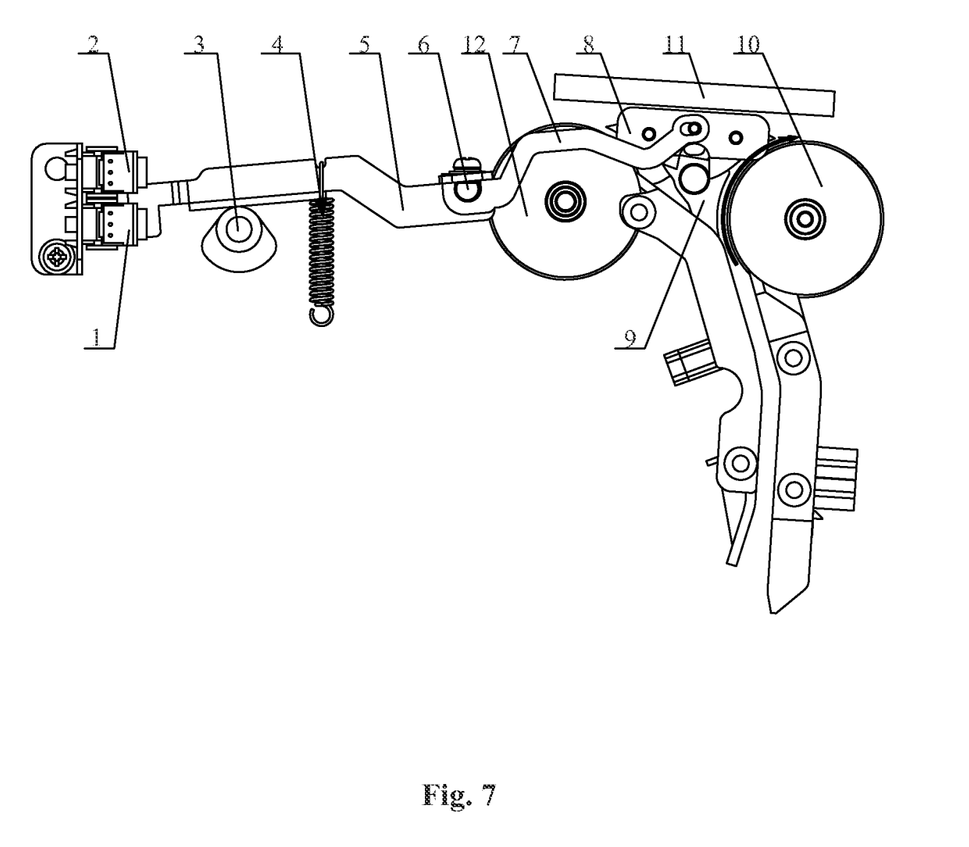
FIG. 7 is a structural diagram of a guider for conveying sheet objects according to an embodiment of the present application in which the other lateral passage is opened.
Figure 8:
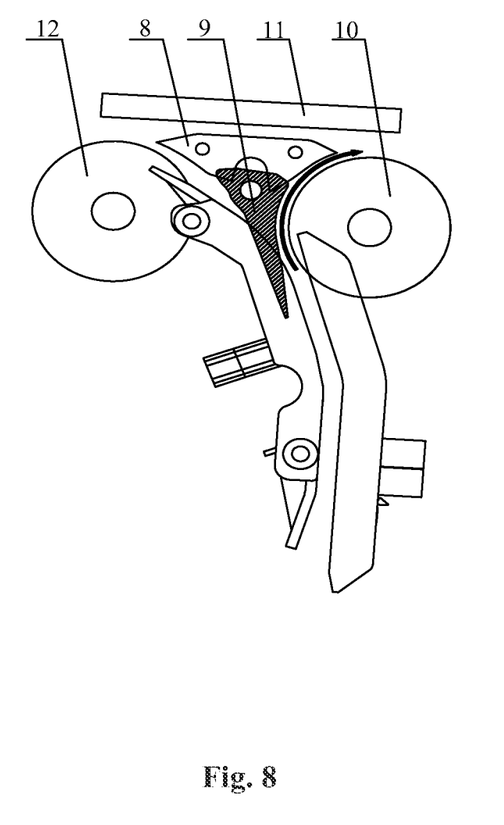
FIG. 8 is an internal structural diagram of a guider for conveying sheet objects according to an embodiment of the present application in which the other lateral passage is opened.

Referring to FIGS. 7 to 8, in the case that the other lateral passage is to be opened as desired, the process of detecting the second connecting arm 5 by the lower sensor 1 is the same as the process where the one lateral passage is to be opened as described above, except that the redirecting member 9 is rotated under the drive of the second driving device to open the other lateral passage. Thus, the detailed operation will not be described herein.

In a preferred embodiment, the upper sensor 2 and the lower sensor 1 are both of a U-shaped structure, and the second connecting arm 5 is located within the detection limits of the U-shaped structures. Preferably the upper sensor 2 and the lower sensor 1 are both fixed to the side plate by a fixing seat 15.

In the guider for conveying sheet objects according to the embodiments of the present application, the rise-lower passage plate 8 is movably provided between the two side plates (the side plate 16 and the side plate 17). In order to ensure the stability of the upward or downward movement of the rise-lower passage plate 8, a groove 161 is provided in the side plate 16, and a groove 171 is provided in the side plate 17, so that both ends of the rise-lower passage plate 8 are slidable in the grooves.

Preferably, two sides of the rise-lower passage plate 8 are provided with multiple comb teeth to facilitate guiding for sheet objects. Preferably, the multiple comb teeth are uniformly distributed on the two sides of the rise-lower passage plate 8.

The guider for conveying sheet objects according to the embodiments of the present application may be applicable to process sheet objects such as banknotes or bills, and may be applied to the devices such as a ticket vending machine or an automatic teller machine. Preferably, the guider for conveying sheet objects is a guider for conveying banknotes.

The skilled in the art can implement or use the present application based on the above description of the embodiments disclosed herein. Many modifications made to these embodiments will be apparent for the skilled in the art. The general principle defined herein may be implemented in other embodiments without departing from the spirit or scope of the present application. Thus, the present application will not be limited to these embodiments illustrated herein, but is consistent to broadest scope which conforms to the principle and novel features disclosed herein.

What is claimed is:

1. A guider for conveying sheet objects, comprising:
    two side plates;
        two wheel assemblies disposed in parallel between the two side plates, a top passage plate being provided at tops of the two wheel assemblies;
        a rise-lower passage plate provided among the two wheel assemblies and the top passage plate, wherein a horizontal passage is formed between the rise-lower passage plate and the top passage plate, and lateral passages are formed between the rise-lower passage plate and one of the wheel assemblies as well as between the rise-lower passage plate and the other one of the wheel assemblies, and wherein the rise-lower passage plate is arranged hoistably and lowerably in the two side plates;
        a first driving device adapted to drive the rise-lower passage plate to move upwardly or downwardly;
        a redirecting member hinged between the two lateral passages and configured to perform a switch between the two lateral passages; and
    a second driving device adapted to drive the redirecting member to rotate.

2. The guider for conveying sheet objects according to claim 1, wherein the first driving device comprises:
    a motor;
    a cam connected with an output shaft of the motor;
    a rotation shaft, which has two ends hinged to the two side plates respectively;
    two first connecting arms, each of which has two ends fixedly connected to the rotation shaft and the rise-lower passage plate respectively; and
    a second connecting arm fixedly connected to the rotation shaft and being in contact with a rim of the cam, wherein the rise-lower passage plate is located at an uppermost position if a lowermost position of the rim of the cam is in contact with the second connecting arm.

3. The guider for conveying sheet objects according to claim 2, further comprising an extension spring, which has one end hitched to the second connecting arm and the other end hitched to the side plate adjacent to the second connecting arm.

4. The guider for conveying sheet objects according to claim 3, wherein the motor is fixed to the side plate adjacent to the second connecting arm by a motor fixing seat.

5. The guider for conveying sheet objects according to claim 2, further comprising a controller, an upper sensor and a lower sensor, wherein the upper sensor and the lower sensor are provided on the side plate adjacent to the second connecting arm, are arranged in an up-and-down form, and are adapted to detect a position of the second connecting arm,
    and wherein the controller is adapted to receive a signal from the upper sensor and the lower sensor and to control the motor to start or stop in response to the signal.

6. The guider for conveying sheet objects according to claim 5, wherein the upper sensor and the lower sensor are each of a U-shaped structure, and the second connecting arm is located within the detection limits of the U-shaped structures.

7. The guider for conveying sheet objects according to claim 1, wherein grooves are provided in the side plates, and two ends of the rise-lower passage plate are slidable in the grooves.

8. The guider for conveying sheet objects according to claim 7, wherein two sides of the rise-lower passage plate are provided with a plurality of comb teeth.

9. The guider for conveying sheet objects according to claim 8, wherein the plurality of comb teeth is distributed uniformly on the two sides of the rise-lower passage plate.

10. The guider for conveying sheet objects according to claim 1, wherein the guider for conveying sheet objects is a guider for conveying banknotes.

11. The guider for conveying sheet objects according to claim 10, wherein the first driving device comprises:
a motor;
a cam connected with an output shaft of the motor;
a rotation shaft, which has two ends hinged to the two side plates respectively;
two first connecting arms, each of which has two ends fixedly connected to the rotation shaft and the rise-lower passage plate respectively; and
a second connecting arm fixedly connected to the rotation shaft and being in contact with a rim of the cam, wherein the rise-lower passage plate is located at an uppermost position if a lowermost position of the rim of the cam is in contact with the second connecting arm.

12. The guider for conveying sheet objects according to claim 11, further comprising an extension spring, which has one end hitched to the second connecting arm and the other end hitched to the side plate adjacent to the second connecting arm.

13. The guider for conveying sheet objects according to claim 12, wherein the motor is fixed to the side plate adjacent to the second connecting arm by a motor fixing seat.

14. The guider for conveying sheet objects according to claim 11, further comprising a controller, an upper sensor and a lower sensor, wherein the upper sensor and the lower sensor are provided on the side plate adjacent to the second connecting arm, are arranged in an up-and-down form, and are adapted to detect a position of the second connecting arm, and wherein the controller is adapted to receive a signal from the upper sensor and the lower sensor and to control the motor to start or stop in response to the signal.

15. The guider for conveying sheet objects according to claim 14, wherein the upper sensor and the lower sensor are each of a U-shaped structure, and the second connecting arm is located within the detection limits of the U-shaped structures.

16. The guider for conveying sheet objects according to claim 10, wherein grooves are provided in the side plates, and two ends of the rise-lower passage plate are slidable in the grooves.

17. The guider for conveying sheet objects according to claim 16, wherein two sides of the rise-lower passage plate are provided with a plurality of comb teeth.

18. The guider for conveying sheet objects according to claim 17, wherein the plurality of comb teeth is distributed uniformly on the two sides of the rise-lower passage plate.

* * * * *